(12) United States Patent
Jauss

(10) Patent No.: US 11,122,212 B2
(45) Date of Patent: Sep. 14, 2021

(54) IMAGE RECORDING METHOD AND IMAGE RECORDING APPARATUS

(71) Applicant: Scholly Fiberoptic GmbH, Denzlingen (DE)

(72) Inventor: Joachim Jauss, Rheinhausen (DE)

(73) Assignee: Schölly Fiberoptic GmbH, Denzlingen (DE)

( * ) Notice: Subject to any disclaimer, the term of this patent is extended or adjusted under 35 U.S.C. 154(b) by 0 days.

(21) Appl. No.: 16/598,432

(22) Filed: Oct. 10, 2019

(65) Prior Publication Data

US 2020/0137282 A1 Apr. 30, 2020

(30) Foreign Application Priority Data

Oct. 31, 2018 (DE) .......................... 102018127287.1

(51) Int. Cl.
*H04N 5/235* (2006.01)
*H04N 5/58* (2006.01)

(52) U.S. Cl.
CPC ......... *H04N 5/2352* (2013.01); *H04N 5/2353* (2013.01); *H04N 5/2354* (2013.01); *H04N 5/58* (2013.01)

(58) Field of Classification Search
None
See application file for complete search history.

(56) References Cited

U.S. PATENT DOCUMENTS

| 6,630,960 B2 * | 10/2003 | Takahashi | H04N 5/2351 348/229.1 |
| 8,212,892 B2 | 7/2012 | Yamazaki | |
| 9,568,898 B2 | 2/2017 | Graganz et al. | |
| 9,844,312 B2 * | 12/2017 | Mizuno | H04N 9/045 |
| 10,116,876 B2 * | 10/2018 | Ikeda | H04N 5/2351 |
| 10,146,039 B2 | 12/2018 | Schnitzler | |
| 10,624,535 B2 * | 4/2020 | Sakanoue | A61B 1/06 |
| 2005/0219381 A1 * | 10/2005 | Takeuchi | H04N 5/235 348/229.1 |
| 2012/0155899 A1 * | 6/2012 | Watanabe | G03G 15/5058 399/49 |
| 2014/0171738 A1 * | 6/2014 | Kagaya | A61B 1/051 600/109 |
| 2019/0156516 A1 * | 5/2019 | Nikkanen | H04N 5/2355 |

(Continued)

FOREIGN PATENT DOCUMENTS

| CN | 102245078 | 11/2011 |
| CN | 103782244 | 5/2014 |

(Continued)

*Primary Examiner* — James M Hannett
(74) *Attorney, Agent, or Firm* — Volpe Koenig

(57) ABSTRACT

An image recording method (2) and an image recording apparatus (1) are provided for recording a sequence of individual images of a scene (3), wherein, in a first control loop (6), an exposure parameter (8) is set in dependence on a respective brightness value (21) of an individual image, wherein the scene (3) is illuminated using an illumination device (4), wherein, in a second control loop (7), a maximum value (10) of a control range (9) of the exposure parameter (8) in the first control loop (6) is set, wherein the setting of the maximum value (10) is effected in dependence on an exposure variable (11), which indirectly stands for an expected quantity of light incident on an image sensor.

14 Claims, 3 Drawing Sheets

(56) References Cited

U.S. PATENT DOCUMENTS

| | | | | |
|---|---|---|---|---|
| 2019/0235743 A1* | 8/2019 | Ono | ................... | H04N 5/23216 |
| 2019/0320107 A1* | 10/2019 | Zhou | ..................... | H04N 5/2351 |
| 2020/0065950 A1* | 2/2020 | Wang | ................... | H04N 5/2353 |
| 2020/0077012 A1* | 3/2020 | Miyai | ................ | A61B 1/00009 |
| 2020/0112662 A1* | 4/2020 | Sakamoto | ................. | G06T 7/74 |

FOREIGN PATENT DOCUMENTS

| | | |
|---|---|---|
| CN | 105359029 | 2/2016 |
| DE | 102016002174 | 8/2017 |
| JP | H08294039 | 11/1996 |

* cited by examiner

IMAGE RECORDING METHOD AND IMAGE RECORDING APPARATUS

INCORPORATION BY REFERENCE

The following documents are incorporated herein by reference as if fully set forth: German Patent Application No. 10 2018 127 287.1, filed Oct. 31, 2018.

BACKGROUND

The invention relates to an image recording method for recording a sequence of individual images of a scene, wherein, in a first control loop, an exposure parameter is set in dependence on a respective brightness value of an individual image, wherein the scene is illuminated using an illumination device.

The invention further relates to an image recording apparatus for recording a sequence of individual images of a scene, wherein the image recording apparatus has an illumination device for illuminating the scene and a closed-loop control unit. For example, the image recording apparatus can be an endoscope. Said endoscope is for example an endoscope for examining living beings and/or for the visual inspection of difficult-to-access cavities. The closed-loop control unit can in particular be configured to set a brightness value of an individual image to be recorded in a manner such that a brightness value of the individual image lies within a definable brightness range.

Image recording methods and image recording apparatus of the type mentioned in the introductory part are already known from the prior art. For example, if an individual image is too dark, the brightness value is generally increased by the closed-loop control unit in a manner such that an exposure parameter in the form of gain is automatically increased. This makes it possible to maintain the total sensitivity of an image recording apparatus, even though an illumination situation has worsened, for example, because a light intensity of an illumination device was reduced. It may be necessary in particular in the case of a medical application to reduce a light intensity so as to protect tissue against overheating. In order to obtain a virtually constant image impression, the missing amount of light is therefore compensated by increasing the gain.

However, it has been found that the gain is occasionally set in an unsuitable manner for specific illumination situations because of automatic gain control, as a result of which for example an overshoot/a brightness that is too low or noise can occur, which in the worst case results in an image quality that is so bad that a user can no longer recognize the recorded scene on the image. It is necessary, however, especially in the medical field, that for example a surgeon can see at all times during an invasive procedure where he or she is within the body so as not to accidentally damage tissue because of poor image quality.

SUMMARY

It is therefore the object of the invention to eliminate the aforementioned disadvantages so as to improve the use properties of previous image recording methods and/or image recording apparatuses.

The object is achieved by one or more features of the invention. In particular, an image recording method of the type mentioned in the introductory part is provided to achieve the stated object according to the invention, wherein, in a second control loop, a maximum value of a control range of the exposure parameter in the first control loop is set, and wherein the maximum value is set in dependence on an exposure variable. In this way, the control range of the exposure parameter can become variable in dependence on an illumination situation. In this case, the upper value (maximum value) of the control range of the exposure parameter is increased or lowered in dependence on the exposure variable when the exposure variable changes. It is thus possible to prevent undesired overshoot or undesired reduction of the total sensitivity of the system from occurring. In particular, it is thereby possible to set the total sensitivity of the system in a manner such that a desired working range (threshold value) is not exceeded, with insufficient image quality occurring outside the working range.

For example, it is possible thereby to prevent, as was previously the case, the gain from being increased too far if insufficient brightness of an individual image is determined, until the brightness is considered to be sufficiently high for the automatic gain control in a first situation. However, if, with the same exposure situation and when merely pivoting the image recording apparatus onto another region of the scene, a greater reflection of the light emitted by the illumination device onto the scene occurs or if the ascertained light intensity increases (second situation), the total sensitivity of the system will thereafter be set too high. The user will thus be able to see the recorded scene only insufficiently, and the system would include too much noise in the non-defined working region. The invention proceeds from this point to be able to avoid such incorrect settings in future.

Advantageous configurations of the invention will be described below, which can be used alone or in combination with one or more of the features of other configurations.

According to an advantageous development of the image recording method, provision can be made for the exposure parameter to be gain. Alternatively or additionally thereto, the exposure parameter can also be an exposure time (can correspond to the shutter time) and/or a stop setting. The exposure time can be controlled mechanically and/or electronically. The stop setting can refer for example to a stop aperture.

The exposure variable can be for example a parameter or a combination of two or more parameters from the group consisting at least of a light intensity of the illumination device, a stop setting, a read time of an image sensor, a power consumption of the illumination device, a temperature of the illumination device and/or an actuation signal of the illumination device. The second control loop can use any of said exposure variables to set, in dependence thereon, a fixed maximum value of the control range of the exposure parameter. In this case, an individual exposure variable or a plurality of exposure variables can be introduced into the second control loop for setting the maximum value. Due to the second control loop, feedback of the first control loop with respect to an actual and/or expected exposure situation is thus created to perform setting of the brightness value of an individual image to be recorded. For example, the respective maximum values of the control range can be stored with the associated value of the exposure variables in a conversion table. Furthermore, a change and/or limitation of the reading time can be effected for example upon switching from a first operating mode to a second operating mode which is established for example for the recording of high-speed images. Moreover, a limitation of the exposure time may consequently also be required. Under certain circumstances, a plurality of maximum values of different exposure parameters can consequently also be set in dependence on an exposure variable.

According to a further configuration, a light intensity of the illumination device, for example the previously mentioned light intensity of the illumination device, can be measured, wherein the measured light intensity is adopted as the exposure variable in the second control loop. For example, the light intensity can be measured by way of a light measurement of the light emitted in the direction of the scene by the illumination device. The light measurement can here be effected using a suitable sensor, for example a photometer. The light intensity of the illumination device can also be determined and/or measured indirectly by way of an actuation signal of the illumination device and/or a power consumption of the illumination device and/or a temperature of the illumination device.

According to a further configuration, provision may be made for the illumination device to be designed for setting different light intensities. In particular, provision may be made here for a fixed maximum value of the exposure parameter to be assigned to each settable light intensity of the illumination device. In the medical field, it is possible that an illumination device excessively heats tissue, with the result that the light intensity of the illumination device must be reduced to avoid tissue damage. Conversely, it may also be the case that an increase in light intensity becomes necessary, for example if a distance of an image recording apparatus from the scene increases.

In order to allow the risk of an incorrect setting of the maximum value of the control range of the illumination parameter, provision may be made for the maximum value of the control range of the exposure parameter to be set independently of a respective brightness value of an individual image. Alternatively or additionally thereto, provision may be made for a setting of the illumination parameter to be effected within the limits of the control range in dependence of the respective brightness value of the individual image. The brightness value can, for example, be an average value from a plurality of pixel values, in particular from an image center, of an individual image. The brightness value can preferably be measured in a recorded individual image and then be adopted in the first control loop.

According to a further configuration, the maximum value of the control range of the exposure parameter can be increased if a, or the, light intensity of the illumination device is reduced. Alternatively or additionally thereto, according to a further configuration, the maximum value of the control range of the exposure parameter can be reduced if a light intensity of the illumination device, for example the previously mentioned light intensity of the illumination device, is increased.

According to a further configuration, the maximum value of the control range of the exposure parameter can remain constant in the case of a constant exposure variable, in particular in the case of a constant light intensity of the illumination device, and/or the maximum value of the control range of the exposure parameter can remain constant in the case of an increase in a distance of an image recording apparatus from the scene.

The aforementioned object is furthermore achieved by one or more features of the apparatus. In particular, the invention provides an image recording apparatus of the type mentioned in the introductory part for achieving the aforementioned object, wherein the closed-loop control unit is configured for working through a first control loop and a second control loop, wherein the first control loop comprises setting an exposure parameter in dependence on a respective brightness value of an individual image, and wherein the second control loop comprises setting a maximum value of a control range of the exposure parameter in the first control loop in dependence on an exposure variable. Consequently, the same advantages apply to the image recording apparatus as were previously described with respect to the image recording method.

According to one configuration of the image recording apparatus, the latter can be designed for performing the image recording method, as is described and claimed herein.

BRIEF DESCRIPTION OF THE DRAWINGS

The invention will now be described in more detail on the basis of an exemplary embodiment, without being limited to said exemplary embodiment. Further exemplary embodiments result from the combination of the features of individual or a plurality of claims with one another and/or with individual or a plurality of features of the exemplary embodiments.

In the figures.

DETAILED DESCRIPTION

Figure 1:
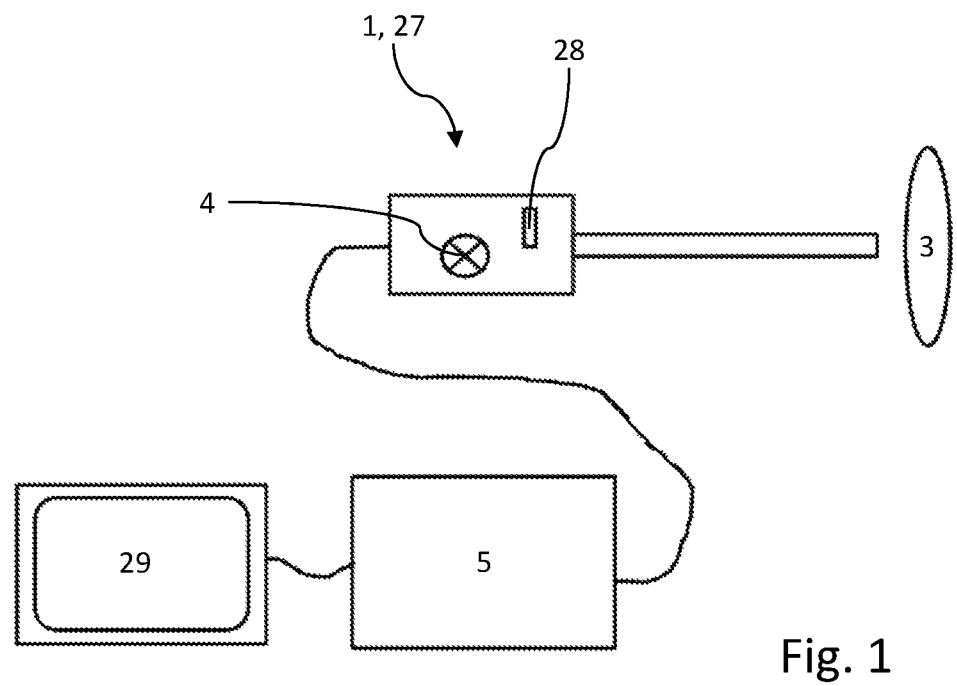
FIG. 1 shows a schematic overview of a possible embodiment of the image recording apparatus, which is here in the form of an endoscope.

FIG. 1 shows an image recording apparatus which is provided throughout with the reference sign 1. The illustrated embodiment variant shows an image recording apparatus 1 in the form of an endoscope 27.

The image recording apparatus 1 can be used to record a scene 3, for example in a cavity. The image recording apparatus 1 is therefore configured for recording a sequence of individual images of the scene 3.

In order to be able to illuminate the scene 3 as optimally as possible, the image recording apparatus 1 has an illumination device 4. A region of the scene 3 that is illuminated by the illumination device 4 therefore at least partially, in particular substantially, overlaps with a field of view of the image recording apparatus 1.

The image recording apparatus 1 additionally has a closed-loop control unit 5. The closed-loop control unit 5 is configured to perform, by way of a first control loop 6, setting of an exposure parameter 8 in dependence on a respective brightness value 21 of a recorded individual image. In order to avoid or prevent overcompensation or under compensation by automatically setting the exposure parameter 8, the closed-loop control unit 5 comprises a second control loop 7. The second control loop 7 is configured to engage with the first control loop 6 so as to set, in particular automatically set, a maximum value 10 of a control range 9 of the exposure parameter 8 in dependence on a measured and/or set and/or indirectly determined exposure variable 11. Due to the therefore dynamic maximum value 10 of the control range 9 of the exposure parameter 8, it is possible to prevent oversensitivity or any sensitivity of the system that is too low, which means that no noise occurs and the user always attains optimum image quality of the recorded scene 3.

The image recording apparatus 1 can be configured to perform, in particular automatically, the image recording method 2 described below.

Figure 5:
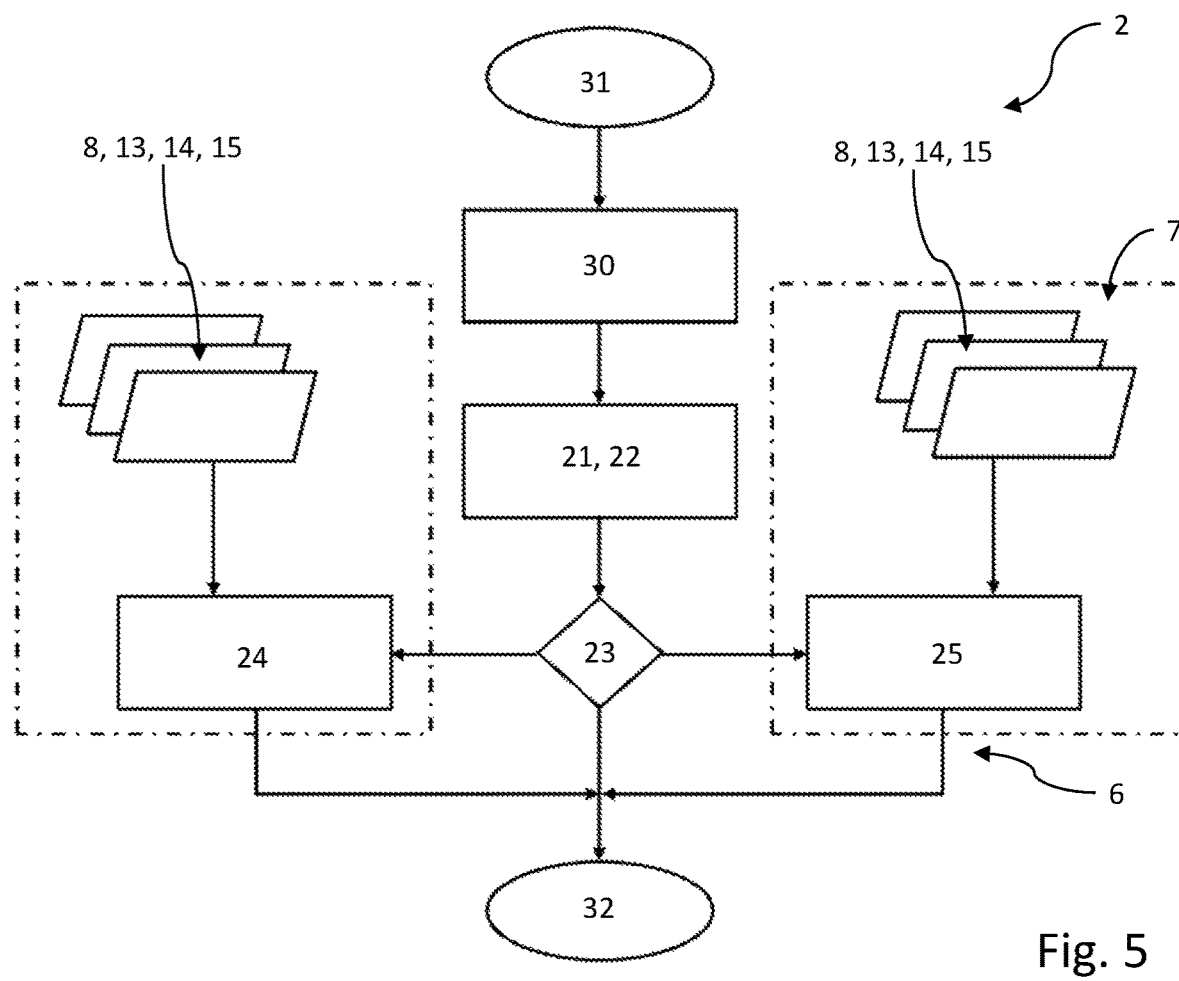
FIG. 5 shows a simplified schematic overview of a possible embodiment of the image recording method according to the invention.

FIG. 5 shows a simplified illustration of the individual steps of the image recording method 2.

Figure 6:
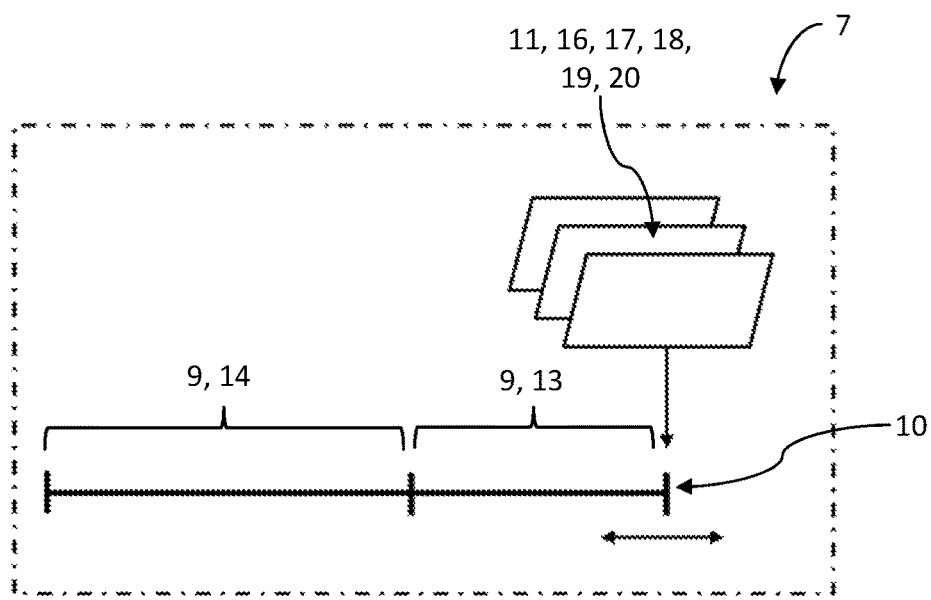
FIG. 6 shows a simplified schematic overview of a possible configuration of a second control loop, wherein the double arrow illustrates the setting of the maximum value of the control range of the exposure parameter, wherein the exposure parameter in the present case relates to gain.

FIG. 6 illustrates the second control loop that is indicated in FIG. 5 in slightly more detail.

As has already been described before with respect to the image recording apparatus 1, the image recording method 2 is configured for recording a sequence of individual images of the scene 3.

Figure 2:
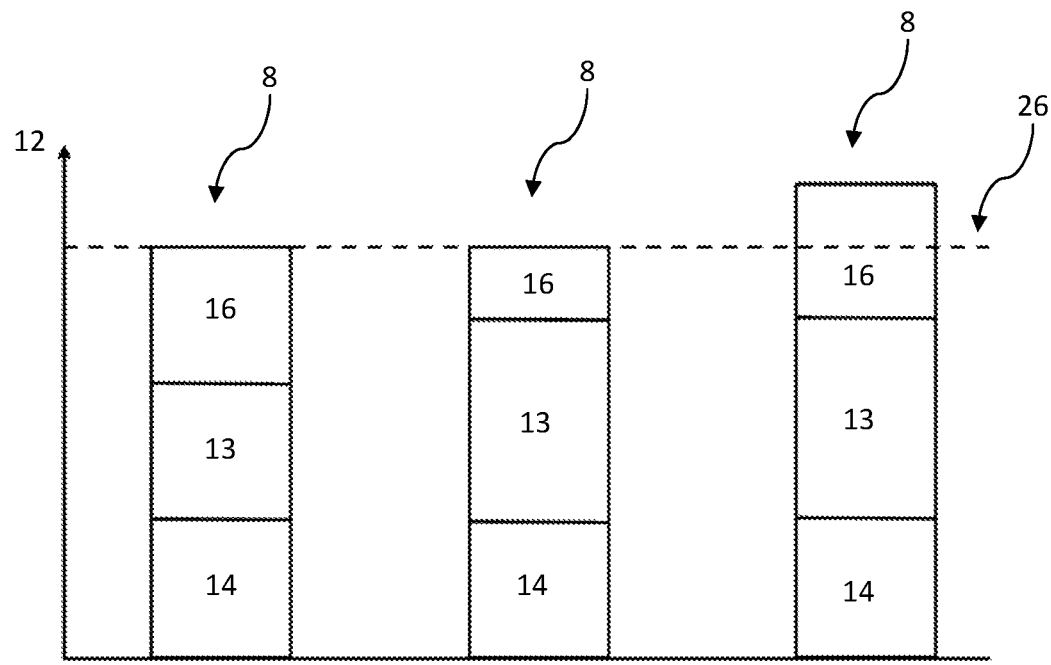
FIG. 2 shows a diagram for the total sensitivity in an image recording system, in which no exposure variable is taken into consideration for setting a control range of an exposure parameter and a brightness of an image to be recorded is thus determined only by a first control loop (corresponding to the prior art), wherein the third bar diagram illustrates a situation in which overcompensation of the total sensitivity of the system occurs, possibly resulting in noise, for example.

The image recording method 2 has a first control loop 6 through which setting of an exposure parameter 8 for recording an individual image in dependence on a brightness value 21 of an individual image that was recorded in a previous step is performed, in particular in automated fashion. This type of sensitivity setting of an image recording system is already known and has the disadvantage that overcompensation or under compensation of the sensitivity range may occur, such that a threshold value of the sensitivity range is exceeded. This situation is illustrated in FIG. 2, wherein the left bar diagram shows a starting situation in which the total sensitivity 12 of the system is made up in equal parts of gain 13, an exposure time 14, and a light intensity 16. In the present case, a constant exposure time 14 is to be provided at all times. Consequently, if the light intensity 16 is reduced, as is shown in the central bar diagram, it is necessary to increase the gain 13 to maintain a desired brightness value 21. Since the gain 13 is set independently of the light intensity 16, the case may arise that a gain 13 that is too high or too low is set if the light intensity 16 is increased. This results in poor image quality, which manifests for example in noise of the output signal, because a threshold value 26 of the total sensitivity 12 of the system has been exceeded. In this case, which is shown in the right bar diagram, a user would therefore be unable to sufficiently perceive the recorded scene 3 from the output signal. This can have dire consequences in the medical field of application, for example, because the user is momentarily "blind" and thus no longer able to trace his or her movements for example within a cavity. This can result in damaged tissue.

The image recording method 2 according to the invention therefore has a second control loop 7. The second control loop 7 engages with the first control loop 6 insofar as a maximum value 10 of a control range 9 of the exposure parameter 8 of the first control loop 6 is set in dependence on an exposure variable 11. By adapting the maximum value 10 to an exposure variable 11, it is possible to prevent overcompensation and thus exceeding the threshold value 26, because the system knows, or rather can estimate, when an ideal system sensitivity 26 is achieved.

The exposure parameter 8 can be gain 13, for example. However, it is also possible, for example with constant gain 13 and/or other constant exposure parameters 8, to set an exposure time 14 and/or a stop setting 15 in dependence on a brightness value 21 as the relevant exposure parameter 8. In this case, it is thus possible to set a maximum value 10 of the exposure time 14 and/or of the stop setting 15 in dependence on an exposure variable 11.

The exposure variable 11 can be one or more different parameters. For example, it may be a parameter or a combination of two or more parameters selected from the group of the set light intensity 16 of the illumination device 4, a stop setting 15, a read time 17 of an image sensor 28, for example of the previously mentioned image recording apparatus 1, a power consumption 18 of the illumination device 4, a temperature 19 of the illumination device 4, and/or an actuation signal 20 of the illumination device 4.

The exposure variable 11 used is preferably a parameter that is directly or indirectly related to the light intensity 16 of the illumination device 4, in particular one that changes proportionally with respect to the light intensity 16 of the illumination device 4. It is thus possible for the system to estimate what quantity of light will ultimately be incident on the image sensor 28 and what brightness value 21 is thus expected.

Figures 3, 4:
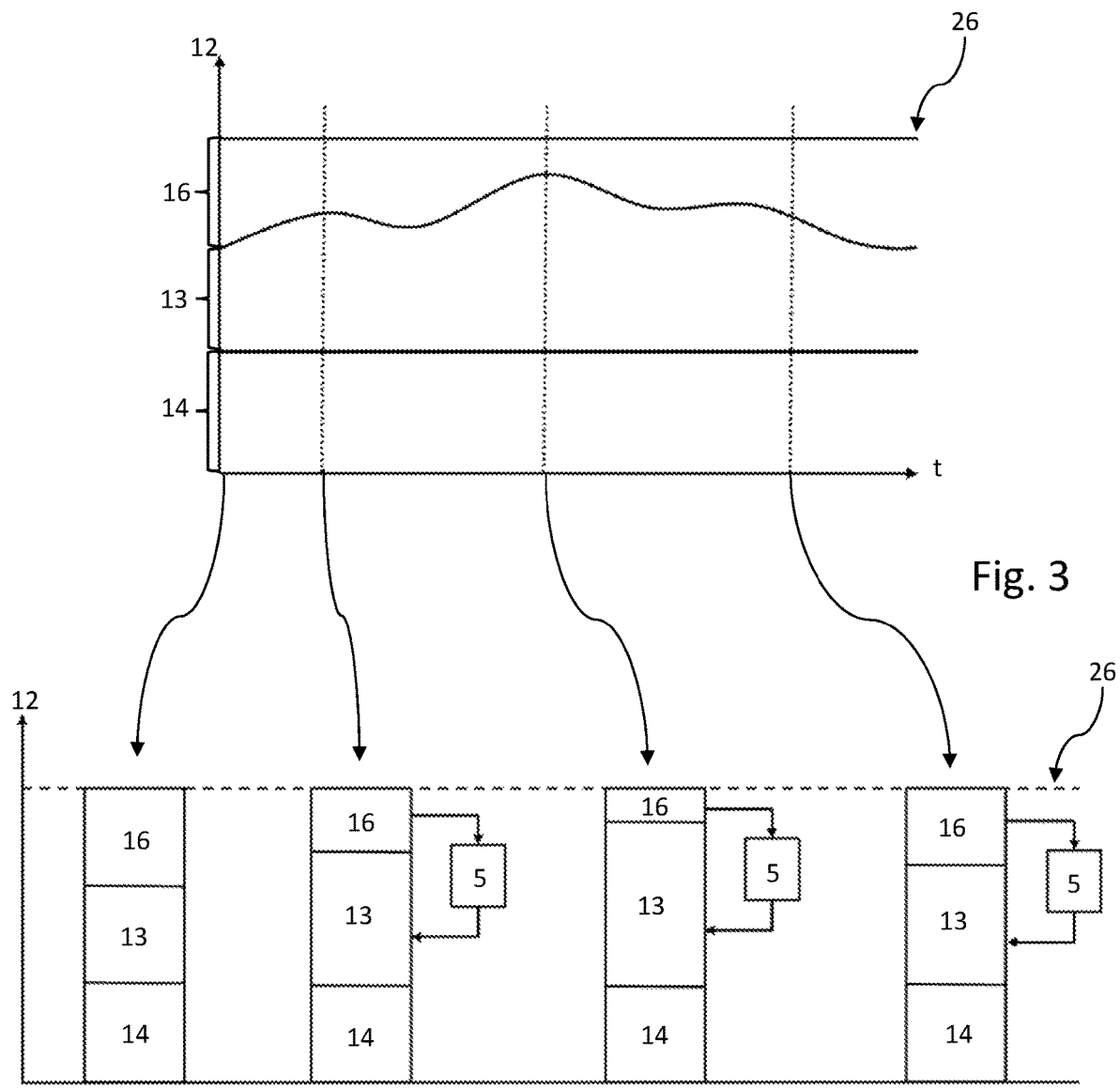
FIG. 3 shows a time diagram for the total sensitivity in an image recording system, in which an embodiment variant of the image recording method according to the invention and/or the image recording apparatus according to the invention are used, such that, in a second control loop, a maximum value of a control range of the exposure parameter in the first control loop is set, wherein setting of the maximum value is effected in dependence on an exposure variable, with the result that the total sensitivity does not exceed a predetermined or determinable threshold value (can correspond to an ideal total sensitivity) and therefore no noise or no image that is too dark occurs.
FIG. 4 shows a selection of individual time points of the time diagram from FIG. 3, wherein the figure illustrates how the second control loop engages with the first control loop to set the maximum value of the control range of the exposure parameter.

Such closed-loop control is shown for example in FIGS. 3 and 4, wherein a constant exposure time 14 is provided here. A first bar diagram from the left in FIG. 4 shows a starting situation that corresponds to the starting situation in FIG. 2.

If a first reduction in the light intensity 16 occurs, it is consequently expected that a lower quantity of light that is reflected by the scene is incident on the image sensor 28. The illumination device 4 can therefore be designed for example for setting different light intensities. In order to be able to compensate for this in a manner such that an at least approximately constant image impression is maintained, the image recording method 2 increases the gain 13 within the limits of the control range 9 such that the threshold value 26 of the total sensitivity 12 is reached. At the same time, the maximum value 10 of the control range 9 is increased in dependence on the light intensity 16. The total sensitivity 12 is composed here, too, of the light intensity 16, the gain 13, and the exposure time 14 (see second bar diagram from the left in FIG. 4).

If a second reduction in the light intensity 16 occurs, the previously described step repeats, wherein a new maximum value 10 of the control range 9 is set in dependence on the light intensity 16, with the result that the instantaneous gain 13 can now be set higher than previously (cf. third bar diagram from the left in FIG. 4).

If, finally, the light quantity 16 increases again, it also becomes necessary to set a new maximum value 10 of the control range 9 to avoid overcompensation. The maximum value 10 is thus reduced such that the control range 9 becomes narrower again (cf. fourth bar diagram from the left in FIG. 4).

It is thus possible to assign to each light intensity 16 a specific maximum value 10 of the control range 9. The maximum value 10 in this case is set independently of the measured brightness value 21 of a recorded individual image.

If, for example, a distance of an image recording apparatus 1 from the scene 3 increases, the light quantity that is incident on the image sensor 28 thus decreases. The system detects that the brightness value 21 of the recorded individual image has decreased and therefore increases the gain 13 with constant exposure time 14 within the limits of the control range 9, without the maximum value 10 changing in the process.

FIG. 5 shows an exemplary procedure of an image recording method 2. The method starts at start 31. Next, image recording 30 is performed. In step 22, a determination of the brightness value 21 of the individual image is affected. In step 23, the brightness value 21 is compared to a target value.

If the recorded individual image is too bright, the image recording method 2 is continued in step 24, where an exposure parameter 8 is reduced within the limits of the control range 9. The control range 9 is, as previously described, set by fixing the maximum value 10. The setting of the control range 9 via the maximum value 10 is effected in dependence on an exposure variable 11, which is done in a second control loop, which is shown in FIG. 6.

If the recorded individual image is too dark, the image recording method 2 is continued in step 25, where an exposure parameter 8 is increased within the limits of the control range 9. Here, too, the control range 9 is set by setting the maximum value 10 in dependence on an exposure variable 11.

It is possible here that not just one exposure parameter 8, but two or more than two exposure parameters 8, for example selected from the previously mentioned exposure parameters 8, are set in dependence on an exposure variable 11 or in dependence on a plurality of exposure variables 11, for example selected from the previously mentioned exposure variables 11.

The invention thus relates to an image recording method 2 and to an image recording apparatus 1 for recording a sequence of individual images of a scene 3, wherein, in a first control loop 6, an exposure parameter 8 is set in dependence on a respective brightness value 21 of an individual image, wherein the scene 3 is illuminated using an illumination device 4, wherein, in a second control loop 7, a maximum value 10 of a control range 9 of the exposure parameter 8 in the first control loop 6 is set, wherein the setting of the maximum value 10 is effected in dependence on an exposure variable 11, which indirectly stands for an expected quantity of light incident on an image sensor.

LIST OF REFERENCE SIGNS

1 Image recording apparatus
2 Image recording method
3 Scene
4 Illumination device
5 Closed-loop control unit
6 First control loop
7 Second control loop
8 Exposure parameter
9 Control range of the exposure parameter
10 Maximum value of the control range
11 Exposure variable
12 Total sensitivity
13 Gain
14 Exposure time
15 Stop setting
16 Light intensity
17 Read time of the image sensor
18 Power consumption of the illumination device
19 Temperature of the illumination device
20 Actuation signal of the illumination device
21 Brightness value
22 Brightness determination
23 Check if brightness value lies within working range
24 Increase exposure parameter
25 Reduce exposure parameter
26 Threshold value
27 Endoscope
28 Image sensor
29 Display apparatus
30 Image recording
31 Start
32 End

The invention claimed is:

1. An image recording method (2) for recording a sequence of individual images of a scene (3), the method comprising:
    in a first control loop (6), setting an exposure parameter (8) in dependence on a respective brightness value (21) of an individual image,
    illuminating the scene (3) using an illumination device (4),
    in a second control loop (7), setting a maximum value (10) of a control range (9) of the exposure parameter (8) in the first control loop (6),
    effecting the setting of the maximum value (10) in dependence on an exposure variable (11), setting the maximum value (10) of the control range (9) of the exposure parameter (8) independently of a respective brightness value (21) of an individual image, and
    wherein a setting of the exposure parameter (8) within the limits of the control range (9) in dependence on the respective brightness value (21) of the individual image is effected, and the brightness value (21) is an average value from a plurality of pixel values of an individual image.

2. The image recording method (2) as claimed in claim 1, wherein the exposure parameter (8) is at least one of a gain (13), an exposure time (14), or a stop setting (15).

3. The image recording method (2) as claimed in claim 1, wherein the exposure variable (11) is a light intensity of the illumination device (4), and the illumination device (4) is configured for setting different light intensities (16), and a fixed maximum value (10) of the exposure parameter (8) is assigned to each settable light intensity (16) of the illumination device (4).

4. The image recording method (2) as claimed in claim 1, wherein the exposure variable (11) is a parameter or a combination of two or more parameters from the group including: a light intensity (16) of the illumination device (4), a stop setting (15), a read time (17) of an image sensor (28), a power consumption (18) of the illumination device (4), a temperature (19) of the illumination device (4), or an actuation signal (20) of the illumination device (4).

5. The image recording method (2) as claimed in claim 4, further comprising at least one of measuring or indirectly determining the light intensity (16) of the illumination device (4) using a light measurement of the light emitted in a direction of the scene (3) by the illumination device (4), and adopting the light intensity (16) in the second control loop (7) as the exposure variable (11).

6. The image recording method (2) as claimed in claim 1, further comprising measuring the brightness value (21) in a recorded individual image.

7. The image recording method (2) as claimed in claim 1, further comprising increasing the maximum value (10) of the control range (9) of the exposure parameter (8) if a light intensity (16) of the illumination device (4) is reduced.

8. The image recording method (2) as claimed in claim 1, further comprising reducing the maximum value (10) of the control range (9) of the exposure parameter (8) a light intensity (16) of the illumination device (4) is increased.

9. The image recording method (2) as claimed in claim 1, wherein the maximum value (10) of the control range (9) of the exposure parameter (8) remains constant for a constant exposure variable (11).

10. The image recording method (2) as claimed in claim 9, wherein the maximum value (10) of the control range (9) of the exposure parameter (8) remains constant for a constant light intensity (16) of the illumination device (4).

11. An image recording method (2) for recording a sequence of individual images of a scene (3), the method comprising:
  in a first control loop (6), setting an exposure parameter (8) in dependence on a respective brightness value (21) of an individual image,
  illuminating the scene (3) using an illumination device (4),
  in a second control loop (7), setting a maximum value (10) of a control range (9) of the exposure parameter (8) in the first control loop (6),
  effecting the setting of the maximum value (10) in dependence on an exposure variable (11),
  wherein the maximum value (10) of the control range (9) of the exposure parameter (8) remains constant for a constant exposure variable (11), and
  the maximum value (10) of the control range (9) of the exposure parameter (8) remains constant for an increase in a distance of an image recording apparatus (1) from the scene (3).

12. An image recording apparatus (1) for recording a sequence of individual images of a scene (3), the image recording apparatus (1) comprising:
  an illumination device (4) for illuminating the scene (3),
  a closed-loop control unit (5) that is configured for working through a first control loop (6) and a second control loop (7), in which the first control loop (6) is configured to set an exposure parameter (8) in dependence on a respective brightness value (21) of an individual image, and the second control loop (7) is configured to set a maximum value (10) of a control range (9) of the exposure parameter (8) in the first control loop (6) in dependence on an exposure variable (11),
  wherein the exposure variable (11) is a parameter that is directly or indirectly related to the light intensity (16) of the illumination device (4), and
  wherein the closed-loop control unit (5) is configured such that a setting of the exposure parameter (8) within the limits of the control range (9) in dependence on the respective brightness value (21) of the individual image is effected, and the brightness value (21) is an average value from a plurality of pixel values of an individual image.

13. The image recording apparatus (1) of claim 12, wherein the image recording apparatus comprises an endoscope (27).

14. The image recording apparatus (1) as claimed in claim 12, wherein the closed-loop control unit is configured to, set the exposure parameter (8) in dependence on the respective brightness value (21) of the individual image in the first control loop (6), illuminate the scene (3) using the illumination device (4), and, in the second control loop (7), set the maximum value (10) of the control range (9) of the exposure parameter (8) in the first control loop (6) and effect the setting of the maximum value (10) in dependence on the exposure variable (11).

* * * * *